(No Model.)

I. W. ARCHIBALD.
THILL COUPLING.

No. 334,838. Patented Jan. 26, 1886.

Witnesses:
Taylor E. Brown
Lew. E. Curtis

Inventor:
I. W. Archibald
By Jas. A. Cowles
his Attorney.

UNITED STATES PATENT OFFICE.

ISAAC W. ARCHIBALD, OF ELGIN, ILLINOIS.

THILL-COUPLING.

SPECIFICATION forming part of Letters Patent No. 334,838, dated January 26, 1886.

Application filed June 4, 1885. Serial No. 167,613. (No model.)

*To all whom it may concern:*

Be it known that I, ISAAC W. ARCHIBALD, a citizen of the United States, residing in Elgin, in the State of Illinois, have invented certain new and useful Improvements in Shaft-Shackles, of which the following is the specification.

Figure 1:
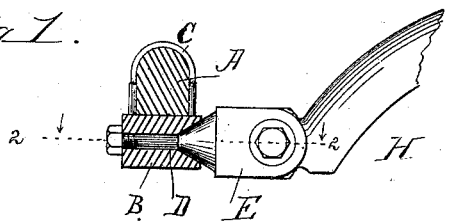
Figure 2:
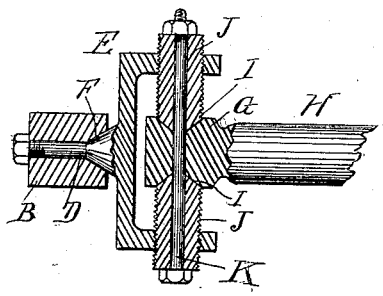
Figure 3:
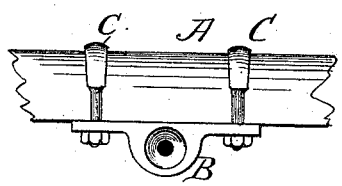

Figure 1 is a vertical sectional view. Fig. 2 is a view through line 2 2, Fig. 1. Fig. 3 is a view of the part attached to axle.

The object of this invention is to provide a cheap, strong, and anti-rattling shackle for the purpose of attaching thills or tongue to the buggy.

A is the axle.

B is socket-piece attached to the axle by the ordinary clamps, C C, being provided with the hole D, with the front end reamed out, as shown in the figures.

E is the forked iron, provided with the shank F, which is made in form and shape to fit into the hole D in the socket-piece B—that is, the base of the shank is conical and the rest of it is straight, having a tread, and not to hold in the socket-piece.

G is the thill-iron on the end of thill H, provided on opposite sides with sockets I I.

J J are screw-pins passing through the forks of the forked iron E and fitting into the sockets I I.

K is a bolt passing through the screw-pins J J, thill-iron G, and forks of forked iron E, having on one end a head and on the other a nut and screw. The socket-piece B can be placed on top of the axle, if desired. The ends of the screw-pins J J fitting into the sockets I I are cone-shaped and conform to the shape of the sockets.

I am aware that conical fastenings have been used in shaft-shackles for buggies; hence I do not claim their use in a broad sense; but the manner of construction shown herein is believed to be new.

I claim—

The combination of the forked piece E, provided with screw-holes in each arm, conical screw-pins J J, fitting and working in the screw-holes in arms of forked piece E, socketed thill-iron G, and bolt K, passing through conical screw-pins J J, substantially as shown.

ISAAC W. ARCHIBALD.

Witnesses:
W. E. LOMBARD,
GEO. H. MORGAN.